(12) United States Patent
Jonsky et al.

(10) Patent No.: US 11,543,788 B2
(45) Date of Patent: Jan. 3, 2023

(54) METHOD FOR ADJUSTING A PARAMETER VALUE OF A POSITION CONTROLLER AND FOR ADJUSTING A PARAMETER VALUE OF A ROTATIONAL SPEED CONTROLLER, AND AN ELECTRIC DRIVE SYSTEM

(71) Applicant: Lenze SE (Societas Europaea), Aerzen (DE)

(72) Inventors: Torben Jonsky, Hannover (DE); Johannes Kuehn, Braunschweig (DE)

(73) Assignee: Lenze SE (Societas Europaea), Aerzen (DE)

( * ) Notice: Subject to any disclaimer, the term of this patent is extended or adjusted under 35 U.S.C. 154(b) by 95 days.

(21) Appl. No.: 17/209,870

(22) Filed: Mar. 23, 2021

(65) Prior Publication Data

US 2021/0349431 A1 Nov. 11, 2021

(30) Foreign Application Priority Data

Mar. 23, 2020 (DE) ...................... 10 2020 203 710.8

(51) Int. Cl.
*G05B 13/04* (2006.01)
(52) U.S. Cl.
CPC .................................. *G05B 13/042* (2013.01)
(58) Field of Classification Search
CPC ........................ G05B 13/042; G05B 19/0426
USPC ........................................ 318/560, 562, 638
See application file for complete search history.

(56) References Cited

U.S. PATENT DOCUMENTS

| 5,684,375 A | 11/1997 | Chaffee et al. |
| 10,007,249 B2 * | 6/2018 | Tazawa ................. G05B 19/358 |
| 2013/0346897 A1 | 12/2013 | Warner et al. |
| 2018/0284722 A1 | 10/2018 | Maruno et al. |

FOREIGN PATENT DOCUMENTS

| DE | 10 2017 221 222 A1 | 5/2019 |
| WO | WO 2007/122904 A1 | 11/2007 |

OTHER PUBLICATIONS

German-language Office Action issued in German Application No. 10 2020 203 710.8 dated Nov. 13, 2020 (10 pages).

* cited by examiner

*Primary Examiner* — David Luo
(74) *Attorney, Agent, or Firm* — Crowell & Moring LLP

(57) ABSTRACT

A method for adjusting a parameter value of a position controller and a parameter value of a rotational speed controller is provided. The position controller and the rotational speed controller are cascaded and are a component of a control circuit. The method includes generating and displaying a two-dimensional parameter adjusting field, wherein points in the two-dimensional parameter adjusting field are selectable by a user, and a specific parameter value of the position controller and a specific parameter value of the rotational speed controller are allocated to a point, and after the user has selected a point adopting the specific parameter value of the position controller that is allocated to the selected point and adopting the specific parameter value of the rotational speed controller that is allocated to the selected point.

12 Claims, 2 Drawing Sheets

METHOD FOR ADJUSTING A PARAMETER VALUE OF A POSITION CONTROLLER AND FOR ADJUSTING A PARAMETER VALUE OF A ROTATIONAL SPEED CONTROLLER, AND AN ELECTRIC DRIVE SYSTEM

BACKGROUND AND SUMMARY OF THE INVENTION

The invention relates to a method for adjusting a parameter value of a position controller and for adjusting a parameter value of a rotational speed controller and to an electric drive system.

The object of the invention is to provide a method for adjusting a parameter value of a position controller and for adjusting a parameter value of a rotational speed controller and to provide an electric drive system, by way of which the parameter values can be adjusted in a simple as possible manner.

The method serves to adjust a parameter value of a position controller and to adjust a parameter value of a rotational speed controller, wherein the position controller and the rotational speed controller are connected in a cascading manner or in series and are a component of an (entire or external) control circuit. In this regard, reference is made to the relevant technical literature.

The method comprises the following steps.

A two-dimensional parameter adjusting field is generated and displayed accordingly, wherein points in the two-dimensional parameter adjusting field can be selected by a user, for example by way of clicking a mouse or via a touch screen on a corresponding point of the parameter adjusting field, wherein a specific parameter value of the position controller and a specific parameter value of the rotational speed controller are allocated to a point. For example, it is possible to allocate an X-coordinate of the point to the parameter value of the position controller and to allocate a Y-coordinate of the point to the parameter value of the rotational speed controller or conversely.

After the user has selected the point, in particular directly, the specific parameter value of the position controller that is allocated to the selected point and the specific parameter value of the rotational speed controller that is allocated to the selected point are adopted.

In accordance with one embodiment, it is automatically determined whether the control circuit in the case of the adopted parameter value of the position controller and in the case of the adopted parameter value of the rotational speed controller achieves or exceeds its stability limit.

In accordance with one embodiment, in the event that the control circuit achieves or exceeds its stability limit in the case of the adopted parameter value of the position controller and in the case of the adopted parameter value of the rotational speed controller, the selected point is illustrated in the two-dimensional parameter adjusting field as unstable, for example by way of a corresponding colored coding, flashing display etc.

In accordance with one embodiment, the parameter value of the position controller is a gain factor of the position controller.

In accordance with one embodiment, the parameter value of the rotational speed controller is a gain factor of the rotational speed controller.

In accordance with one embodiment, based on simulated and/or measured operating variables of the control circuit, it is determined whether the control circuit achieves or exceeds its stability limit. The operating variables of the control circuit can be simulated for example based on a machine model.

In accordance with one embodiment, the operating variables include a measured or simulated temporal progression of an electric current of an electric motor of the control circuit, and/or include a measured or simulated temporal progression of a rotational speed of the electric motor and/or a measured or simulated temporal progression of a position of a component that is to be moved by way of the electric motor.

In accordance with one embodiment, a calculated stability limit is illustrated in the two-dimensional parameter adjusting field, for example by way of a suitable colored distinguishing feature of stable and unstable regions, by way of an illustrated limit line, etc.

In accordance with one embodiment, the illustrated stability limit is calculated by way of a frequency analysis, for example by way of a multi-frequency excitation or PRBS of the drive train. In accordance with one embodiment, this calculation is performed whilst taking into consideration the temporal behavior of the inverter and the subordinate control circuit.

In accordance with one embodiment, in the two-dimensional parameter adjusting field a point that is to be selected is illustrated as suggested, to which are allocated a calculated optimal adjustment of the parameter value of the position controller and an optimal adjustment of the parameter value of the rotational speed controller. In addition or as an alternative thereto, it is possible to illustrate at a point selected by a user an optimized point, to which are allocated a calculated optimal adjustment of the parameter value of the position controller and an optimal adjustment of the parameter value of the rotational speed controller. In other words, the optimal parameter values are indicated starting from the adjusted parameter values.

In accordance with one embodiment, an absolute drag error that where appropriate has been integrated or a variable that is dependent thereon is illustrated in the two-dimensional parameter adjusting field. The drag error can be determined by way of a positioning movement that is performed once or a number of times. In addition, it is possible to illustrate visually whether the drag error is greater or smaller than the previous drag error. In addition, it is possible to illustrate visually as a diagram the temporal progression of the integrated drag error or the variables that are dependent thereon.

In accordance with one embodiment, the parameter value of the position controller and the parameter value of the rotational speed controller are automatically adjusted/found as the starting point starting from the selected point.

The electric drive system comprises at least one controller and a controller parameterizing facility that is embodied so as to perform an above described method.

Embodiments of the invention are described in detail below with reference to the drawings.

DETAILED DESCRIPTION OF THE DRAWINGS

Figure 1:
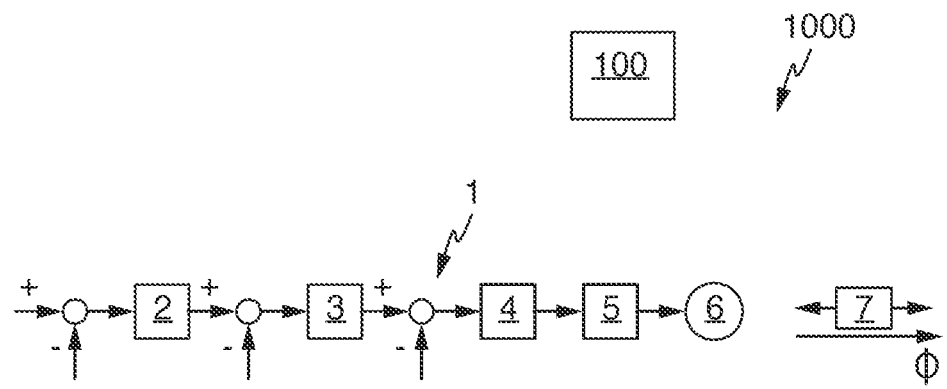
FIG. 1 illustrates a block diagram of an electric drive system having a control circuit comprising a position controller and a rotational speed controller.

FIG. 1 illustrates a block diagram of an electric drive system 1000 having an external control circuit 1 comprising a position controller 2 and a rotational speed controller 3, wherein the position controller 2 and the rotational speed controller 3 are cascaded, as illustrated. The external control circuit 1 comprises in a further conventional manner for example an electric current controller 4, an inverter 5 and an electric motor 6 that is controlled by way of the inverter 5 and drives a component 7 that is to be moved, for example a conveyor belt. In this regard, reference is made to the relevant technical literature.

The position controller 2 can be for example a P-, PI or PID-controller. Accordingly the rotational speed controller can be a P-, PI or PID-controller.

A parameter value in the form of a gain factor VpL of the position controller 2 and a parameter value in the form of a gain factor VpD of the rotational speed controller 3 are adjusted by way of a controller parameterizing facility 100 in accordance with embodiments of the invention as described below with reference to the FIGS. 2 and 3.

Figure 2:
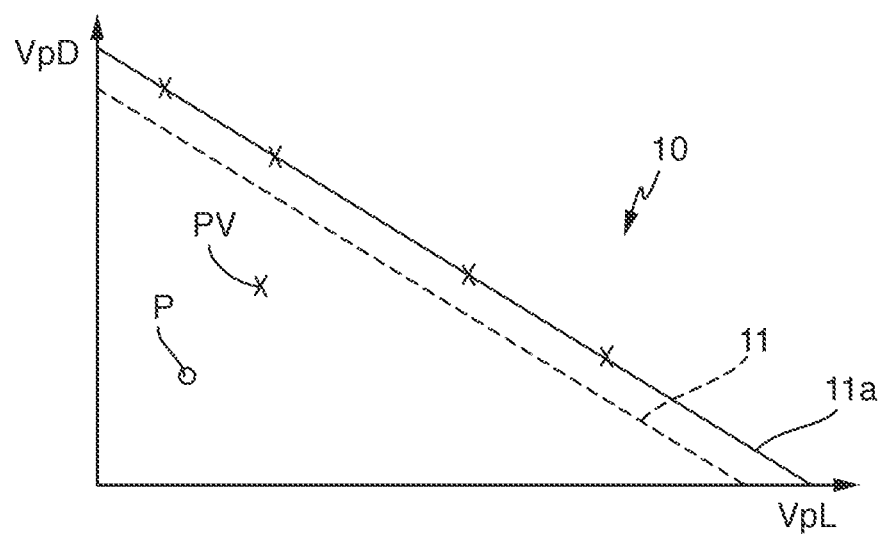
FIG. 2 illustrates a two-dimensional parameter adjusting field, wherein a specific parameter value of the position controller and a specific parameter value of the rotational speed controller are allocated to a point of the two-dimensional parameter adjusting field.

FIG. 2 illustrates a two-dimensional parameterizing adjusting field 10, wherein a gain factor VpL of the position controller 2 is allocated to an X-coordinate of a point P of the two-dimensional parameterizing adjusting field 10 and a gain factor VpD of the rotational speed controller 3 is allocated to a Y-coordinate of the point P.

A user now selects a point P of the parameter adjusting field 10 for example by way of clicking a mouse, wherein after the user has selected the point P the specific gain factor VpL of the position controller 2 that is allocated to the selected point and the specific gain factor VpD of the rotational speed controller that is allocated to the selected point P are adopted.

It is now determined automatically based for example on simulated and/or analytically calculated and/or measured operating variables of the external control circuit 1 whether the external control circuit 1 in the case of the adopted gain factor VpL of the position controller 2 and in the case of the adopted gain factor VpD of the rotational speed controller 3 achieves or exceeds its stability limit. In the event that the control circuit 1 achieves or exceeds its stability limit, the selected point P is illustrated in the two-dimensional dimensional parameter adjusting field 10 as unstable in that the selected point P is illustrated highlighted in color and in a flashing manner.

The operating variables can include for example a temporal progression of an electric current of the electric motor 6 and/or a temporal progression of a rotational speed of the electric motor 6 and/or a temporal progression of a position of the component 7 that is to be moved by way of the electric motor 6 and based on a machine model.

A calculated stability limit 11 is displayed as a line in the two-dimensional parameter adjusting field 10, wherein on one side of the line the control circuit is stable and on the other side of the line is unstable. A real stability limit 11a can be determined for example with reference to (measured) stability indicators (illustrated as x).

It is possible to illustrate as suggested in the two-dimensional parameter adjusting field 10 a point PV that is to be selected, to which are allocated starting from the selected point P a calculated optimal adjustment of the gain factor VpL of the position controller 2 and an optimal adjustment of the gain factor VpD of the rotational speed controller 3.

Figure 3:
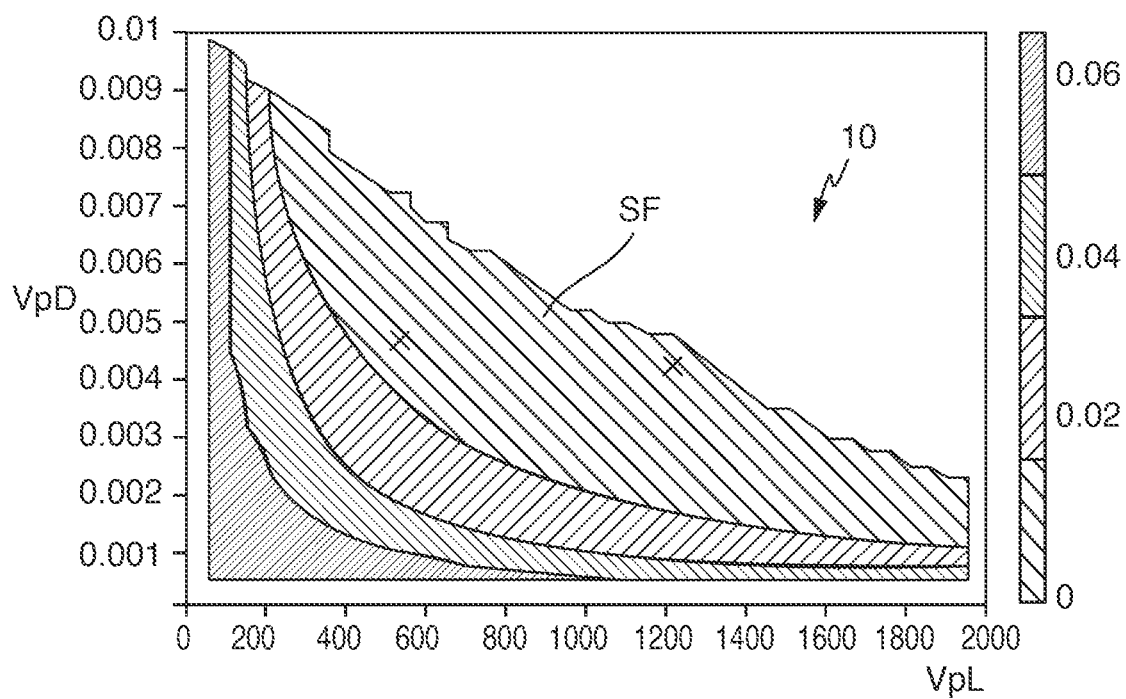
FIG. 3 illustrates a view of a drag error in the two-dimensional parameter adjusting field.

FIG. 3 illustrates in the two-dimensional parameter adjusting field a drag error SF, in dependence upon the gain factors VpL and VpD.

The adjustment of the cascading control procedure of drive systems is frequently performed in a heuristic manner in the two external cascades, position control procedure and rotational speed control procedure. These two controllers are however not to be adjusted independently of one another but rather in conjunction with one another.

Embodiments of the present invention simplify the procedure of parameterizing the two cascaded control circuits, in that the adjustment is visualized and both an analytic and also an experimental stability limit are illustrated.

The adjustment is performed in accordance with embodiments of the invention by way of a two-dimensional parameter field 10 in which a point P is marked, which indicates a corresponding combination of enhancing the position and enhancing the rotational speed. This enhancement is adjusted without delay. If the stability indicator were to change its color or an impending or existing limit stability were to be detected by way of other methods, a marker is illustrated at this location in the parameter field 10. It is likewise possible to draw in the parameter field 10 an analytically calculated stability limit 11 which arises for example from the mass inertia, the parameterized switching frequency and a rotational speed filter.

A further possibility is to draw in a suggestion of an optimal parameterization that would have been found for example after a test signal has been injected.

As an extension to the adjustment, it is possible to visualize in color in the parameter field 10 the drag error SF or a variable that is calculated therefrom with the result that an effect of a change in the enhancements is illustrated. For this purpose, the drag error can be measured for example by way of a defined movement, calculated and drawn in/marked in the diagram as a variable.

The invention renders it possible to visualize in a simple manner the controller adjustment for the position control procedure and the rotational speed control procedure while taking into consideration analytical and measurement-based determinations of the stability limit.

The invention claimed is:

1. A method for adjusting a parameter value of a position controller and a parameter value of a rotational speed controller, wherein the position controller and the rotational speed controller are cascaded and are components of a control circuit, the method comprising:
generating and displaying a two-dimensional parameter adjusting field, wherein points in the two-dimensional parameter adjusting field are selectable by a user, and a specific parameter value of the position controller and a specific parameter value of the rotational speed controller are allocated to a point, and
after the user has selected a point, adopting the specific parameter value of the position controller that is allocated to the selected point and adopting the specific parameter value of the rotational speed controller that is allocated to the selected point.

2. The method according to claim 1, further comprising:
determining whether the control circuit, in case of the adopted parameter value of the position controller and in case of the adopted parameter value of the rotational speed controller, achieves or exceeds its stability limit.

3. The method according to claim 2, further comprising:
when the control circuit achieves or exceeds its stability limit in the case of the adopted parameter value of the position controller and in the case of the adopted parameter value of the rotational speed controller, illustrating the selected point in the two-dimensional parameter adjusting field as unstable.

4. The method according to claim 1, wherein
the parameter value of the position controller is a gain factor of the position controller.

5. The method according to claim 1, wherein
the parameter value of the rotational speed controller is a gain factor of the rotational speed controller.

6. The method according to claim 1, wherein
it is determined whether the control circuit achieves or exceeds its stability limit based on at least one of simulated, analytically calculated, or measured operating values of the control circuit.

7. The method according to claim 6, wherein
the operating variables include at least one of a temporal progression of an electric current of an electric motor of the control circuit, a temporal progression of a rotational speed of the electric motor, or a temporal progression of a position of a component that is to be moved by the electric motor.

8. The method according to claim 1, wherein
a calculated stability limit is indicated in the two-dimensional parameter adjusting field.

9. The method according to claim 1, wherein
in the two-dimensional parameter adjusting field, a point that is to be selected is illustrated as suggested, to which is allocated a calculated optimal adjustment of the parameter value of the position controller and an optimal adjustment of the parameter value of the rotational speed controller.

10. The method according to claim 1, wherein
a drag error or a variable that is dependent on the drag error is illustrated in the two-dimensional parameter adjusting field.

11. The method according to claim 1, wherein
the parameter value of the position controller and the parameter value of the rotational speed controller are automatically adjusted starting from the selected point.

12. An electric drive system comprising:
at least one controller; and
a controller parameterizing facility that is configured to perform the method according to claim 1.

* * * * *